United States Patent
Okubo et al.

(10) Patent No.: US 6,169,670 B1
(45) Date of Patent: Jan. 2, 2001

(54) INVERTER APPARATUS OPERATABLE OVER EXTENDED FREQUENCY RANGE WHILE SUPPRESSING OUTPUT ERROR

(75) Inventors: Tomofumi Okubo, Funabashi; Masahiro Hiragi, Yotsukaidou; Mutsuo Tokashiki, Funabashi, all of (JP)

(73) Assignees: Hitachi, Ltd., Tokyo; Hitachi Keiyo Engineering Co., Ltd., Chiba, both of (JP)

( * ) Notice: Under 35 U.S.C. 154(b), the term of this patent shall be extended for 0 days.

(21) Appl. No.: 09/543,580

(22) Filed: Apr. 5, 2000

(30) Foreign Application Priority Data

Apr. 8, 1999 (JP) .................................. 11-100974

(51) Int. Cl.[7] .................................. H02M 3/335
(52) U.S. Cl. .................. 363/41; 363/95; 363/131
(58) Field of Search .................. 363/16, 40, 41, 363/55, 95, 131; 318/807, 811

(56) References Cited

U.S. PATENT DOCUMENTS

| | | | |
|---|---|---|---|
| 3,636,430 | * | 1/1972 | Kernick et al. ........................ 363/41 |
| 4,748,550 | * | 5/1988 | Okado .................................. 363/98 |
| 5,115,386 | * | 5/1992 | Shirahama et al. .................... 363/41 |
| 5,450,306 | * | 9/1995 | Garces et al. ......................... 363/41 |
| 5,475,293 | * | 12/1995 | Sakai et al. .......................... 318/802 |
| 5,680,034 | * | 10/1997 | Redl .................................... 323/235 |
| 5,793,623 | * | 8/1998 | Kawashima et al. .................. 363/56 |
| 6,005,784 | * | 12/1999 | Ikeshita ................................ 363/37 |
| 6,075,328 | * | 6/2000 | Notohara et al. ..................... 318/254 |

FOREIGN PATENT DOCUMENTS

| | | |
|---|---|---|
| 5-316737 | 11/1993 | (JP) . |
| 7-143735 | 6/1995 | (JP) . |
| 10-23756 | 1/1998 | (JP) . |

* cited by examiner

*Primary Examiner*—Adolf Deneke Berhane
(74) *Attorney, Agent, or Firm*—Antonelli, Terry, Stout & Kraus, LLP

(57) ABSTRACT

An inverter apparatus operatable over an extended output frequency range having an increased upper limit with error contained in the output voltage being suppressed by eliminating dispersions of PWM pulse signals. A PWM command pulse signal and an output voltage detection signal derived from the output of the inverter are compared straightforwardly with each other for determining difference therebetween on the basis of which error contained in the inverter output voltage is canceled. An isolation device for isolating electrically a low-voltage-rated control circuitry and a high-voltage-rated main circuitry from each other is inserted between a PWM command pulse signal generating circuit and a pulse width correcting circuit.

10 Claims, 4 Drawing Sheets

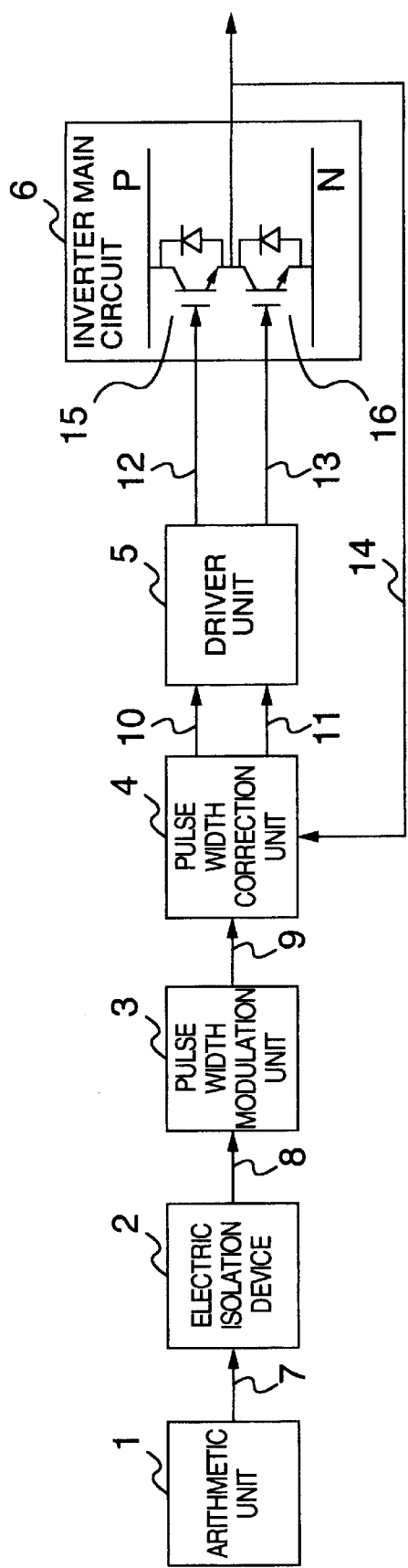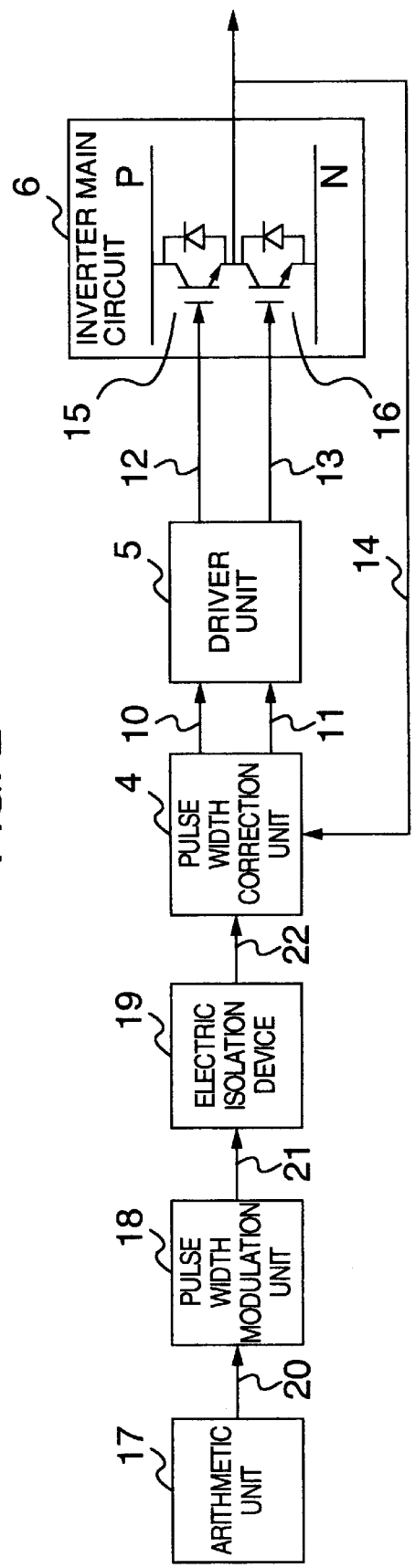

INVERTER APPARATUS OPERATABLE OVER EXTENDED FREQUENCY RANGE WHILE SUPPRESSING OUTPUT ERROR

BACKGROUND OF THE INVENTION

The present invention generally relates to a PWM inverter apparatus. More particularly, the invention is concerned with a PWM inverter apparatus which can ensure a high-speed transmission of command data for generation of a PWM pulse signal while ensuring an enhanced accuracy for the control of the inverter output voltage.

The inverter apparatus receiving an AC or DC power for conversion thereof to an AC power of a given frequency for performing a speed control of an AC motor connected to the output of the inverter is well known in the art and employed widely in practical applications.

In the inverter apparatuses developed recently, bipolar transistors, insulated gate bipolar transistors (hereinafter also referred to as the IGBT in short) or the like are used as the switching elements constituting an inverter main circuit for the inverse power conversion. Further, a pulse width modulation control (referred to as the PWM control in short) is generally adopted for making the waveform of the inverter output voltage to approximate a sine wave while decreasing higher harmonic components.

As the inverter apparatus known heretofore, there may be mentioned one disclosed in JP-A-7-143735 (hereinafter referred to as the publication (1)). In this known inverter apparatus, a photocoupler is inserted in a transmission line for supplying a driving signal or signals from a signal generator circuitry to the switching elements constituting major parts of the inverter main circuit for electrically isolating the signal generating circuitry operating at a low voltage (i.e., low-voltage-rated circuitry) from the inverter main circuit operating at a high voltage (i.e., high-voltage-rated circuit).

As is described in the publication (1), in the inverter apparatuses in general, the switching elements constituting major parts of the inverter main circuit are electrically connected in the form of a bridge circuit, wherein the switching elements of upper and lower arms of the bridge circuit are connected in series to an input DC power supply. For performing the on/off control of the switching elements, a non-lap period (hereinafter referred to as the dead time period or simply as the dead time) is provided during which the driving signals are cleared simultaneously in order to inhibit the switching elements of the upper/lower arms from being turned on or closed simultaneously. Parenthetically, the turning-on/off of the switching elements is accompanied with time delays. Further, the turn-on/off characteristics of the switching elements are not uniform but vary from one element to another. In other words, dispersion is found among the switching elements in respect to the on/off characteristics. In addition, the on/off characteristics of the switching element are likely to vary under the influence of ambient temperature changes and dispersion of the time taken for the transmission of the driving signals. For these reasons, the dead time mentioned above is ordinarily set with some margin or tolerance.

Furthermore, it is noted that a period in which the switching elements of the upper/lower arms assume simultaneously the off-state occurs during the dead time period. Consequently, the output voltage of the inverter is affected by the direction in which the output current flows during the dead time period, presenting thus an uncertain factor.

For the reasons mentioned above, the output voltage of the inverter apparatus contains non-negligible error components, giving rise to an acute problem.

For coping with the problem mentioned above, there has certainly been proposed such an arrangement of the inverter apparatus that the direction of the output current is detected in an effort to cancel the output voltage error which depends on the flow direction of the output current, as disclosed in JP-A-5-316737 (hereinafter referred to as the publication (2)). However, with the arrangement described in this publication (2), it is impossible to compensate for the output voltage error which is ascribable to the dispersion of the on/off characteristics among the switching elements, differences in the susceptibilities of the switching elements to the temperature changes and dispersion of the transmission time of the driving signals.

Furthermore, in JP-A-10-23756 (referred to as the publication (3)), such arrangement is described in which the output voltage of the inverter is actually detected for suppressing the actual error of the output voltage relative to the command voltage. More specifically, according to the teachings disclosed in this publication (3), the PWM command pulse signal is compared with the pulse signal derived from the output of the inverter main circuit to detect the error contained in the inverter output voltage in terms of temporal error or deviation for thereby correcting the timings of the rising or leading edge and the falling or trailing edge of the PWM pulse so that the error contained in the inverter output voltage can be suppressed. Owing to this arrangement, there can be obtained the inverter output voltage of the pulse width which conforms to that of the PWM command pulse. In other words, with the techniques taught in the publication (3), error components of the inverter output voltage can certainly be canceled by and large. However, in the inverter apparatus disclosed in the publication (3), a photocoupler is employed in the output voltage detecting circuit as a means for electrically isolating the low-voltage-rated control circuitry and the high-voltage-rated inverter main circuit from each other. This photocoupler however exhibits not a little dispersion in respect to the delay time involved in the pulse transmission. Moreover, the transmission characteristics of the photocoupler tend to change significantly as a function of the temperature. For these reasons, with the arrangement of the inverter apparatus disclosed in the publication (3), it is very difficult or impossible to suppress satisfactorily the error contained in the inverter output voltage, also giving rise to a problem.

Such being the circumstances, there has been proposed an inverter apparatus of the arrangement shown in FIG. 1 of the accompanying drawings as an approach to solve the problems mentioned above. This prior art inverter apparatus is so arranged that the PWM command pulse signal and the inverter output voltage signal as detected are straightforwardly compared with each other without intermediacy of the electrical isolating means to thereby determine the deviation or difference between the command pulse signal and the output voltage signal for correcting the error contained in the inverter output voltage on the basis of the deviation as determined. In this inverter apparatus, the electrical isolating means for isolating electrically the control circuitry designed to operate at a low voltage from the inverter main circuit operating at a high voltage is interposed between an arithmetic unit for arithmetically determining the pulse command numeric data and the pulse width modulation unit.

This known inverter apparatus will be described in more detail by reference to FIG. 1 of the accompanying drawings. The arithmetic unit 1 which can be realized by using a microcomputer is designed to generate as the output signal thereof a pulse command numeric data signal 7 indicative of pulse generation timings required for generating a PWM command pulse signal 9 and the like. The electric isolation device denoted by reference numeral 2 is provided for the purpose of electrically isolating the low-voltage-rated circuitry including the arithmetic unit 1 from the high-voltage-rated circuitry including the inverter main circuit 6 while allowing the signal to be transmitted from the former to the latter through the isolation device. To this end, the electric isolation device can be implemented by using a photocoupler. Further referring to FIG. 1, reference numeral 3 denotes a pulse width modulation unit for generating the PWM command pulse signal 9, numeral 4 denotes a pulse width correction unit which is designed to receive the PWM command pulse signal 9 from the pulse width modulation unit 3 and the output voltage detection signal 14 derived from the output of the inverter main circuit 6 for thereby correcting the timings at which the PWM pulse signals 10 and 11 rise and fall, respectively. Hereinafter, these timings will be referred to as the leading edge timing and the trailing edge timing, respectively. Further, reference numeral 5 denotes a driver unit which is designed to serve for power amplification of the PWM pulse signals 10 and 11 received from the pulse width correction unit 4 to thereby output driving signals 12 and 13 for the switching elements 15 and 16 incorporated in the inverter main circuit 6 which is designed for converting a DC power to an AC power by means of the switching elements 15 and 16. In this conjunction, each of the switching elements is constituted by an IGBT element (Insulated Gate Bipolar Transistor) or the like. Parenthetically, in FIG. 1, the circuit configuration of the inverter main circuit 6 is illustrated only for one phase for simplification.

In more concrete, the arithmetic unit 1 performs arithmetic operation for generating data concerning the pulse leading and trailing edge timings as the pulse command numeric data signal 7 accompanying no operation delay with the dead time being set zero for the PWM command pulse signal 9 to be generated by the pulse width modulation unit 3. The pulse width correction unit 4 serves to correct delays involved in the operation of the switching elements 15 and 16 by making use of the inverter output voltage detection signal 14 on the basis of the pulse command numeric data signal 7 for thereby causing the driver unit 5 to output the actual driving signals 12 and 13. For the data transmission from the arithmetic unit 1 to the pulse width modulation unit 3, a serial data transmission scheme is adopted.

With the arrangement of the inverter apparatus shown in FIG. 1, the detection unit (not shown) for detecting the output voltage of the inverter main circuit 6 to thereby feed back the inverter output voltage signal to the pulse width correction unit 4 is not provided with the photocoupler or the like for realizing the electric isolation between the detecting unit and the inverter main circuit 6. Instead, the electric isolation is realized between the arithmetic unit 1 and the pulse width modulation unit 3. By virtue of this arrangement, the inverter output voltage detection signal 14 and the PWM command pulse signal 9 can be directly compared with each other for determining the error or difference between the signals 14 and 9 with a high accuracy because the output voltage detection signal 14 is derived without intermediacy of the isolation means such as the photocoupler or the like which provides remarkable dispersion in respect to the delay involved in the signal transmission.

However, in the inverter apparatus shown in FIG. 1, the serial data transmission scheme such as typified by the one for the serial communication is adopted for the transmission of the pulse command numeric data signal to the pulse width modulation unit 3 from the arithmetic unit 1. Consequently, the data transmission time taken for a single data transmission is determined by the transmission rate and the number of data for the serial transmission. This in turn means that it is impossible in principle to update the pulse command numeric data signal 7 within a time shorter than the data transmission time taken for the single serial transmission. Besides, not a little time is taken for the serial data transmission itself. For the control of the output frequency of the inverter apparatus, the pulse command numeric data signal 7 has to be updated at least three times during one period of the output frequency (at least once for each phase) in the case of the three-phase inverter apparatus. Consequently, in the inverter apparatus of the structure shown in FIG. 1, the pulse command numeric data signal 7 has to be transmitted to the pulse width modulation unit 3 from the arithmetic unit 1 three times or more during one period of the output frequency in order to generate the PWM command pulse signal 9 containing three or more pulses. Thus, the upper limit of the output frequency controllable with the structure of the inverter apparatus shown in FIG. 1 is restricted up to the output frequency of one period which is three times as long as the time taken for transmission of a single pulse command numeric data signal 7.

At this juncture, let's consider a practical application of the output frequency control performed by the inverter apparatus. At first, it should be mentioned that with the updating of the pulse command numeric data signal 7 three times for one period of the output frequency, remarkable distortion will be involved in the inverter output voltage. In most of the practical applications, updating of the pulse command numeric data signal 7 at least nine times or twelve times per period is demanded. To say in another way, it is required to shorten the period for updating the pulse command numeric data signal 7. However, with the structure of the inverter apparatus shown in FIG. 1 which is imposed with severe restriction in respect to the allowable data transmission speed or rate as mentioned hereinbefore, an increased number of times for updating will unavoidably be accompanied with correspondingly lowering of the upper limit of the controllable output frequency. In other words, with the structure of the inverter apparatus shown in FIG. 1, the time taken for each transmission of the pulse command numeric data signal 7 determines the upper limit of the output frequency of the inverter in the output control thereof. By way of example, assuming that the time taken for transmission of the pulse command numeric data signal 7 for one phase is 41 $\mu$s, the total transmission time for three phases will amount to 123 $\mu$s. Consequently, when the computation load ratio of 50% is taken into account, each data update operation requires the transmission time of 246 $\mu$s. Since the output frequency is given by the reciprocal of 246 $\mu$s, the upper limit of the output frequency is about 4000 Hz. In this conjunction, it is noted that in the case of a machine for forming holes or through-holes in a printed circuit board, for example, the inverter apparatus having the output frequency of 5000 Hz at the lowest is demanded. Apparently, the inverter apparatus shown in FIG. 1 is not in the position to meet such demand.

As will be appreciated from the above, with the conventional structure of the inverter apparatus such as shown in FIG. 1, the upper limit imposed to the inverter output frequency is too low to realize the inverter capable of making available a high output frequency as desired.

SUMMARY OF THE INVENTION

In the light of the state of the art described above, it is an object of the present invention to solve the problems of the conventional inverter apparatuses elucidated above and provide an improved inverter apparatus which can suppress significantly the dispersion ascribable to the dead time of the PWM pulse signal and obviate error components of the inverter output voltage while mitigating the upper limit imposed to the output frequency range.

In view of the above and other objects which will become apparent as the description proceeds, there is provided according to a general aspect of the invention an inverter apparatus in which the electrical isolation device is disposed in a transmission path for the PWM command pulse signal resulting from the conversion of the numeric data instead of the transmission path for generating the PWM pulses.

By virtue of the arrangement of the inverter apparatus in which the electric signal isolation is not performed for the numeric data outputted from the arithmetic unit which may be constituted by a microcomputer but effectuated for the pulse signal resulting from the conversion of the numeric data, as described above, the time required for the signal transmission can be reduced, which means that the PWM command pulse signal can be updated at a higher rate, whereby the upper limit of the inverter output frequency and hence the output frequency range of the inverter apparatus can be increased significantly.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a block diagram showing a circuit configuration of a conventional inverter apparatus known heretofore;

FIG. 2 is a block diagram showing a general arrangement of an inverter apparatus according to a first embodiment of the present invention;

DESCRIPTION OF THE EMBODIMENTS

Figure 3:
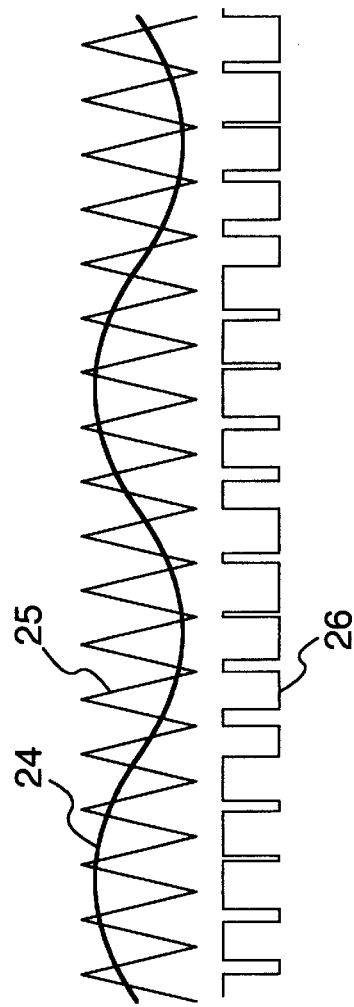
FIG. 3 is a view for illustrating generation of a PWM command pulse signal.

The present invention will now be described in detail in conjunction with what is presently considered as preferred or typical embodiments thereof by reference to the drawings. In the following description, like reference characters designate like or corresponding parts throughout the several views.

FIG. 2 is a block diagram showing a first embodiment of the inverter apparatus. According to the teachings of the invention incarnated in this embodiment, the serial data transmission line extending from the arithmetic unit 1 to the pulse width modulation unit 3 in the conventional inverter apparatus shown in FIG. 1 is replaced by a parallel data transmission bus of a microcomputer. Additionally, in the inverter apparatus according to the invention, the electric isolation device is provided between the pulse width modulation unit and the pulse width correction unit with a view to ensuring a high data transmission speed or rate while simplifying the circuit structure of the electric isolation device, to thereby realize the inverter apparatus which can operate with a high frequency. Furthermore, with the inverter apparatus according to the instant embodiment of the invention, it is contemplated to suppress effectively degradation of the inverter control performance by using such isolation device which can transfer the command pulse signal with negligible error notwithstanding the difference Δt between the leading edge transfer delay time (i.e., delay involved in transferring the rising or leading edge) and the trailing edge transfer delay time (i.e., delay involved in transferring the falling or trailing edge).

Now, the inverter apparatus according to the instant embodiment of the invention will be described in detail by reference to FIGS. 2 and 3.

With the arrangement of the inverter apparatus shown in FIG. 2, the arithmetic unit 17 is designed to determine arithmetically the on/off-time durations and the on/off-timings for the switching elements 15 and 16 by generating a pulse command numeric data signal 20 indicative of the on/off time durations and the on/off timings mentioned above on the precondition that the dead time is zero. The pulse command numeric data signal 20 is then outputted from the arithmetic unit 17 through a parallel data bus system used conventionally in the microcomputer.

Upon reception of the pulse command numeric data signal 20 from the arithmetic unit 17, the pulse width modulation unit 18 converts the pulse command numeric data signal 20 into a PWM command pulse signal 21. In this conjunction, it is noted that the switching elements 15 and 16 provided in upper arm and lower arm, respectively, of the inverter main circuit 6 has to be so operated that the on- and off-states thereof are mutually exclusive in order to prevent short-circuit from occurring between the upper arm and the lower arm of the inverter main circuit 6, as is well known in the art. On the other hand, the pulse width modulation unit 18 is designed to convert the pulse command numeric data signal 20 to the PWM command pulse signal 21 on the precondition that the dead time is zero, similarly to the arithmetic unit 17. Consequently, for the PWM command pulse signal 21, it is equally presumed that the dead time is zero. On these conditions, the conducting time duration, i.e., on-duration or alternatively the nonconducting time duration, i.e., off-duration of the upper/lower arms of the inverter main circuit as well as the on/off timings can be represented by one pulse signal.

FIG. 3 is a view for illustrating generation of the pulse signal (PWM pulse signal). As can be seen in the figure, every time a modulating wave 24 assumes high level relative to a carrier 25, the PWM command pulse signal 26 assumes high level. On the other hand, when the modulating wave 24 assumes low level relative to the carrier 25, the PWM command pulse signal 26 assume low level. The PWM command pulse signal 26 of high level represents a command for turning on the switching element of the upper arm of the inverter main circuit 6 (or alternatively turning off the switching element of the lower arm), while the PWM command pulse signal 26 of low level represents a command for turning on the switching element of the lower arm of the inverter main circuit 6 (or alternatively turning off the switching elements of the upper arm). More specifically, the rising or leading edge of the PWM command pulse signal 26 indicates the on-timing of the upper arm switching elements of the inverter main circuit 6 (or alternatively the off-timing of the lower arm switching elements). In the inverter apparatus shown in FIG. 2, the PWM command pulse signal 21 corresponds to the PWM command pulse signal 26 shown in FIG. 3. Needless to say, this PWM command pulse signal is outputted from the pulse width modulation unit 18.

Further, when the number of timings the pulse command numeric data signal 20 is updated per unitary time increases, the pulses number of the PWM command pulse signal 21 increases correspondingly. In this conjunction, it should be added that by employing the electric isolation device 19 which incorporates the element capable of suppressing or reducing the difference Δt between the leading edge transfer delay time td1 and the trailing edge transfer delay time td2, the inverter control performance can be protected against degradation. More specifically, the transfer or transmission error (i.e., the output voltage error) ΔV contained in the PWM command pulse signal 22 due to the difference Δt upon transmission of the PWM command pulse signal 21 through the isolation device 19 can be given by $$\Delta V = Vdc \times fc \times \Delta t.$$

As is apparent from the above expression, the output voltage error ΔV can be made smaller as the difference Δt becomes smaller. Parenthetically, Vd appearing in the above expression represents a DC voltage between circuit points P and N of the inverter main circuit 6 shown in FIGS. 1 et al, and fc represents the frequency of the carrier 25.

As an example of the isolation device capable of reducing the output voltage error ΔV, a photocoupler capable of withstanding a high voltage and operating at a high speed such as mentioned below can be employed.

In recent years, a high-voltage-rated photocoupler operatable at a high speed has been developed for use as the isolation device (for example, HCPL2611#560 manufactured by Hewlett Packard Japan, Ltd.). This photocoupler satisfied the performance of a minimum outer spatial distance of 9.9 mm, a minimum outer creeping distance of 4.8 mm, a minimum inner spatial distance of 0.08 mm, an input isolation voltage of 2500 V in rms (for one minute), a maximum operative isolation voltage of 560 V in peak, a maximum allowable overvoltage of 4000 V in peak (for ten seconds), and a maximum value of 100 ns as the difference Δt between the leading edge transfer delay time (td1) and the trailing edge transfer delay time (td2).

By converting the pulse command numeric data signal 20 outputted from the arithmetic unit 17 to the PWM command pulse signal 21 by means of the pulse width modulation unit 18 for data transmission through the parallel data bus, the data transmission time can be shortened to be negligible when compared with the serial transmission of the numeric data described hereinbefore by reference to FIG. 1. Thus, when the pulse command numeric data signal 20 outputted from the arithmetic unit 17 changes, the PWM command pulse signal 21 outputted from the pulse width modulation unit 18 can also change rapidly or speedily, which signal 21 is transmitted to the pulse width correction unit 4 by way of the isolation device 19. By employing the photocoupler as the isolation device 19, the high-speed data transmission from the arithmetic unit 17 to the pulse width correction unit 4 can further be improved.

As is apparent from the foregoing, with the structure of the inverter apparatus according to the present invention, high-speed data transmission can be realized by adopting the parallel data bus system for transmission of the pulse command numeric data signal in place of the serial transmission and additionally by allowing the PWM command pulse signal to be transmitted through the electric isolation device instead of the pulse command numeric data signal. Moreover, the data transmission can further be speeded up by using the high-speed photocoupler mentioned previously as the isolation device 19.

Next, a second embodiment of the present invention will be described by reference to FIG. 4 which shows in a block diagram another structure of the PWM inverter apparatus.

In the PWM inverter apparatus now under consideration, the arithmetic unit 17 and the pulse width modulation unit 18 are realized as a control circuit 23 which can be implemented by using a microcomputer.

Figure 4:
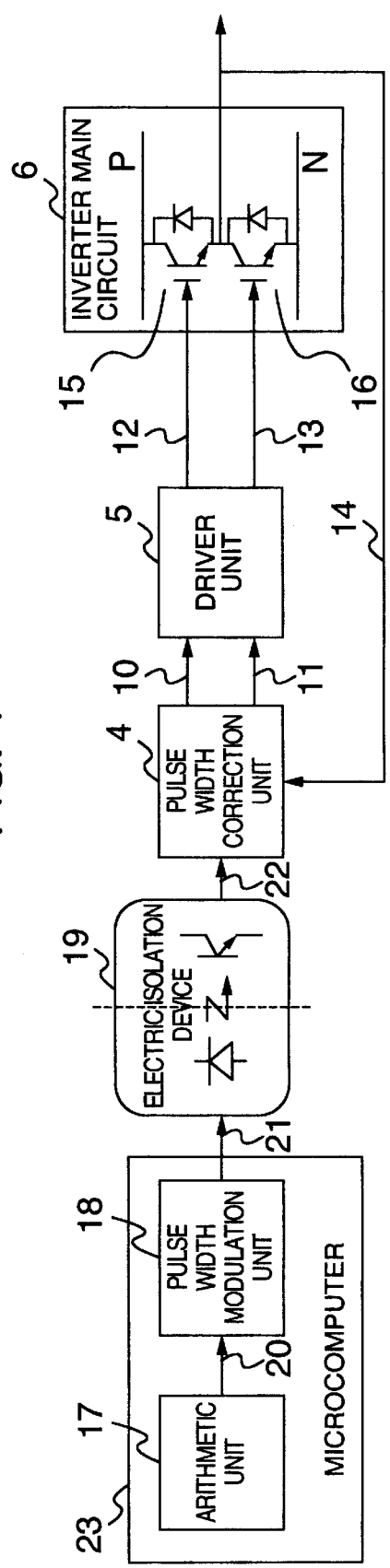
FIG. 4 is a block diagram showing a structure of an inverter apparatus according to a second embodiment of the present invention.

In operation of the PWM inverter apparatus shown in FIG. 4, the pulse command numeric data signal 20 is generated by the arithmetic unit 17 on the precondition that the dead time is zero. The pulse width modulation unit 18 responds to the pulse command numeric data signal 20 supplied from the arithmetic unit 17 to output a PWM command pulse signal 21 which contains width-modulated pulses rather than the numeric data. The isolation device 19 serves for ensuring a high-voltage withstanding insulation or isolation between the pulse width modulation unit 18 and the pulse width correction unit 4 while allowing the PWM command pulse signal 21 to be transferred to the pulse width correction unit as a PWM command pulse signal 22. As the isolation device 19, the high-voltage-rated photocoupler mentioned previously can be employed. The pulse width correction unit 4 compares the PWM command pulse signal 22 transferred through the isolation device 19 with the output voltage detection signal 14 fed back from the output of the inverter main circuit 6 to thereby output the PWM pulse signals 10 and 11 to the driver unit 5. Upon generation of the PWM pulse signal 10; 11, the dead time is additively taken into account for producing the drive pulses, and additionally the difference Δt (output voltage error) is determined on the basis of the PWM command pulse signal 22 and the inverter output voltage detection signal 14 to thereby generate the PWM pulse signals 10; 11 such that the detected error makes disappearance from the inverter output. The error signal (inverter output voltage error) can be determined in terms of the differences of the leading/trailing edge timings of the pulse contained in the inverter output voltage detection signal 14 relative to the leading/trailing edge timings of the PWM command pulse signal 22. The driver unit 5 is designed to amplify the PWM pulse signals 10 and 11 for outputting the driving signals 12 and 13 to drive the switching elements 15 and 16, respectively, of the inverter main circuit 6.

In the structure of the inverter apparatus shown in FIG. 4, the arithmetic unit 17 and the pulse width modulation unit 18 is realized by a microcomputer. On the other hand, the isolation device 19 is realized by using a high-speed photocoupler capable of withstanding a high voltage while the pulse width correction unit 4 may be implemented as a logic circuit with the driver unit 5 being implemented as an IGBT driving circuit for the inverter main circuit 6 which includes the switching elements 15 and 16 realized by using the IGBT elements. In the inverter apparatus now under consideration, the arithmetic unit 17 and the pulse width modulation unit 18 can be realized by using a single microcomputer, as mentioned above. In that case, the period for updating the pulse command numeric data signal 20 depends on the processing capability of the microcomputer. On the other hand, because the pulse signal carrying the on/off time-points data as well as the on/off timings data passes through the isolation device 19 constituted by the high-speed/high-voltage-rated photocoupler, the transmission accuracy of the PWM command pulse signal depends on the dispersions in the leading edge transfer delay time and the trailing edge transfer delay time of the photocoupler.

In this conjunction, it is to be noted that variation of the inverter output voltage ascribable to error factors of the driver unit 5 and the switching elements 15; 16 which are provided in succession to the pulse width correction unit 4 can be corrected by feeding back the inverter output voltage signal to the pulse width correction unit 4. Thus, the PWM command pulse signal 22 inputted to the pulse width correction unit 4 and the PWM pulse signal derived from the output voltage of the inverter main circuit 6 are brought into coincidence with each other. In this manner, in the inverter apparatus implemented in the structure mentioned above, the transmission characteristics of the pulse command numeric data signal 20 depend on the processing capability of the microcomputer as well as the leading edge transfer delay time and the trailing edge transfer delay time of the photocoupler. In this conjunction, it may be presumed that the microcomputer has an adequate processing capability and thus the influence of the microcomputer to the transmission of the pulse command numeric data signal is negligible in view of the fact that in the conventional inverter apparatus, the microcomputer capable of ensuring sufficiently the updating period or frequency for the pulse command numeric data signal 20 is adopted in structuring the inverter apparatus. After all, it can thus be said that the transmission capability of the pulse command numeric data signal 20 depends on the performance of the high-voltage-rated photocoupler which constitutes the isolation device 19. Such being the case, selection of the high-voltage-rated photocoupler as the isolation device 19 and determination of the operation method thereof must be made such that the desired accuracy can be realized for the transmission of the pulse command numeric data signal 20.

Theoretically, the characteristics dispersion and variations such as of the leading edge transfer delay time, the trailing edge transfer delay time and the like which intervene between the input of the PWM command pulse signal (21) to the isolation device 19 inclusive of the photocoupler and the output of the PWM command pulse signal (22) therefrom give rise to influential factors. Consequently, the pulse width correction unit 4 should ideally be so implemented as to compare the PWM command pulse signal 22 with the inverter output detection signal indicative of the output voltage of the inverter main circuit in the state in which the PWM command pulse signal 21 before being inputted to the isolation device 19 coincides with the PWM command pulse signal 22 outputted from the isolation device 19. In actuality, however, the PWM command pulse signal 22 outputted from the isolation device will unavoidably contain the transmission error ascribable to the transmission operation of the isolation device 19. For this reason, the circuit arrangement has to be made such that the transmission error mentioned above can be disregarded in the output control performance of the inverter apparatus. More specifically, in the photocoupler, the signal undergoes a significant delay in transmission. Besides, dispersion of such delay is also remarkable. These factors make appearance as error in the magnitude of the inverter output voltage. By way of example, the photocoupler, the signal transfer error time Δt of which ranges from 600 ns to 1000 ns, has heretofore been employed as the isolation device in many practical applications. However, when the photocoupler which brings about the delay such as mentioned above is employed in the asynchronous type inverter system in which the PWM carrier frequency is held invariably at 16 kHz notwithstanding the modulation frequency being variable, an error voltage of about 2.7 V will make appearance in the output voltage of the inverter apparatus. By way of example, in the case of the inverter apparatus rated for the output voltage of 200 V at a maximum output frequency of 100 Hz, operation of the inverter apparatus at a low frequency of e.g. 0.5 Hz makes available the output voltage of about 1 V as calculated on the basis of the simple proportion or rate of 200 V/100 Hz. In reality, however, the output voltage of the inverter will assume a slightly greater value than the above value when the voltage drop due to impedance of the primary winding of the AC motor is taken into consideration. At this juncture, comparison of the error voltage of 2.7 V mentioned previously with the inverter output voltage of 1 V at 0.5 Hz mentioned just above shows that the value of the error voltage is large, exceeding the expected inverter output voltage of 1 V. This means that when the frequency is low, the inverter output voltage can not be made available in conformance with the command due to the error voltage, giving rise to a serious and big problem. As mentioned hereinbefore, the error voltage ΔV is given by the expression:

$$\Delta V = Vdc \times fc \times \Delta t$$

The difference Δt between the transfer delay times td1 and td2 of the photocoupler bears approximately a proportional relation to the output voltage error ΔV. Such being the circumstances, in the case of the inverter apparatus according to the instant embodiment of the invention, the photocoupler exhibiting the signal transmission delay not greater than 100 ns such as the photocoupler described hereinbefore is selectively employed as the isolation device so that the error voltage does not exceed 0.45 V, with a view to ensuring adequate performance for the inverter apparatus even in the low-frequency operation range or in order to allow the operation frequency range to be increased, to say in another way. Thus, in the inverter apparatus according to the instant embodiment of the invention, the photocoupler to be employed as the isolation device should be so selected that the error voltage ΔV between the leading edge transfer delay time td1 and the Trailing edge transfer delay time td2 does not exceed the value given by ΔV/(Vdc×fc) at the largest, where ΔV represents an output error voltage allowable for the expected lowest level of the inverter output voltage.

Next, referring to FIGS. 5 to 8, description will be directed to the inverter apparatus according to a third embodiment of the present invention which apparatus is so designed that the pulse width correction can be carried out with a further enhanced accuracy.

Figure 5:
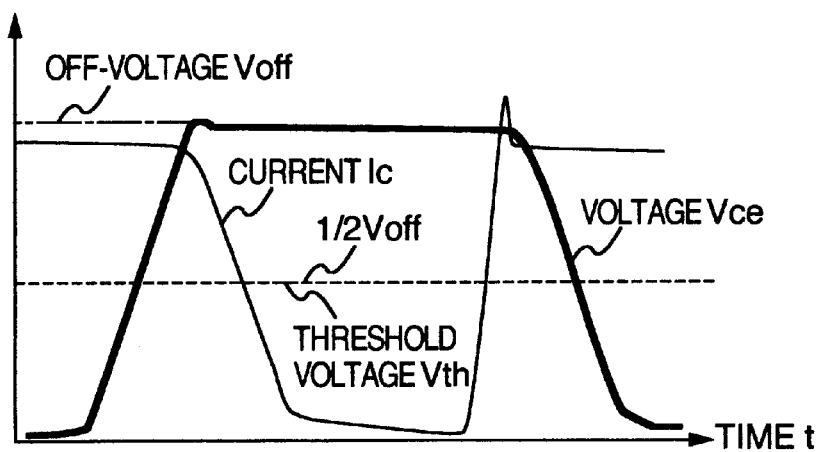
FIG. 5 is a view for graphically illustrating switching characteristics of a planar-type IGBT employed as a switching element.
Figure 6:
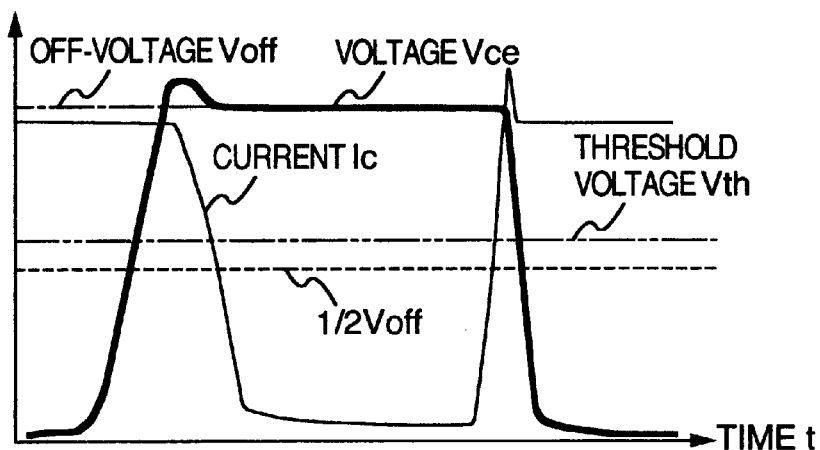
FIG. 6 is a view for graphically illustrating switching characteristics of an NPT-type IGBT.

FIGS. 5 and 6 are views for graphically illustrating the switching characteristics of a collector-emitter voltage Vce and a collector current Ic of an IGBT. The behaviors of the collector-emitter voltage Vce and the collector current Ic differ in dependence on the IGBT manufacturing methods. More specifically, FIG. 5 shows the characteristics of a planar-type IGBT, and FIG. 6 shows the characteristics of an NPT (nonplanar)-type IGBT. As can be seen from these characteristic curves shown in FIGS. 5 and 6, the behaviors of the collector-emitter voltage Vce and the collector current Ic become different in dependence on the methods of manufacturing the IGBTs.

As will be appreciated from the above, all the IGBT elements can not always exhibit same definite switching characteristics. In other words, the switching characteristics of the IGBT elements may differ from one to another. Such being the case, detection of the output voltage of the inverter main circuit is accompanied with a problem in respect to the setting of a threshold voltage referenced for detection of the inverter output voltage. The inverter output voltage is detected in the form of a pulse signal. In that case, the timings or time points at which the leading edge and the trailing edge make appearance in the detected pulse signal provide important factors. Error in these timings entails error in the output voltage as detected.

In order to derive from the actual inverter output voltage the pulse signal representing the output voltage detection signal, a threshold voltage Vth is set at an intermediate level of the actual output voltage to thereby generate the pulse signal in dependence on whether or not the actual output voltage exceeds the threshold voltage Vth. Since the actual output voltage signal can generally be represented by a train of voltage pulses each in the form of trapezoid. Consequently, the width of the output voltage pulse becomes wide or narrow in dependence on the level at which the threshold voltage Vth is set.

Ideally, the inverter output voltage detection should be carried out so that the voltage pulses of the actual voltage become equal to one another in respect to the mean value. When the voltage pulse of the inverter output voltage is of the trapezoidal shape, the ideal condition mentioned above can approximately be satisfied by setting the threshold voltage Vth at a level corresponding to a half of the height of the trapezoidal voltage pulse. In actuality, however, the width of the detected pulse will be deviated from the ideal one due to a delay involved in the detecting operation. Such deviation seems ascribable primarily to the trapezoidal shape of the output voltage pulse and difference in the slope between the leading edge and the trailing edge of the output voltage pulse. More specifically, when the slope of the leading or rising edge is steeper than the trailing or falling edge, the pulse width as detected becomes narrow and vice versa due to the delay involved in the detection. For this reason, it is also taught by the present invention incarnated in the instant embodiment to set the threshold voltage Vth at a lower level than the half voltage mentioned above when the slope of the leading edge of the voltage pulse is steeper than that of the trailing edge, while setting the threshold voltage Vth at a value greater than the aforementioned half voltage when the slope of the leading edge is gentler than that of the trailing edge. Further, in case the waveform(s) of the leading edge and/or the trailing edge itself is distorted, correction or compensation will be required. Thus, the threshold value or level mentioned above should also be adjusted in dependence on the characteristics of the switching elements such as IGBTs employed actually.

Figure 7:
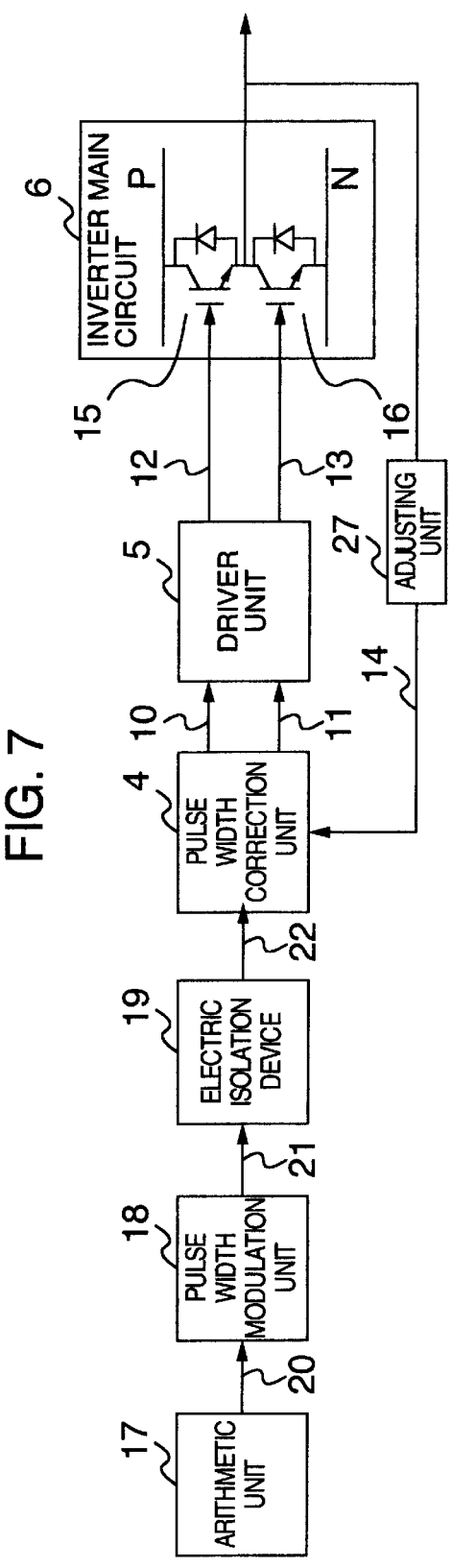
FIG. 7 is a block diagram showing a structure of an inverter apparatus provided with an output voltage detection signal adjusting circuit according to a third embodiment of the present invention.

Thus, in the inverter apparatus according to the third embodiment of the invention, an adjusting unit 27 is provided in association with the output voltage detecting unit for adjusting the threshold voltage to thereby make it possible to detect the output voltage with an enhanced accuracy, as shown in FIG. 7.

In the case of the inverter when the planar type IGBT is employed as the switching element, the slope of the leading (rising) edge of the output voltage detection pulse signal is substantially same as that the trailing (falling) edge, as can be seen from FIG. 5. Thus, the threshold voltage may be set to be a half of the off-voltage Voff. By contrast, in the case of the NPT-type IGBT, the slope of the trailing (falling) edge is very steep (i.e., the rate of change is very high), as can be seen in FIG. 6. Thus, the threshold voltage Vth should be set at a level slightly higher than the level of ½ Voff in consideration of the delay involved in the operation of the output voltage detecting unit. The adjustment of the threshold voltage or detection level can be carried out by the adjusting unit 27.

Figure 8:
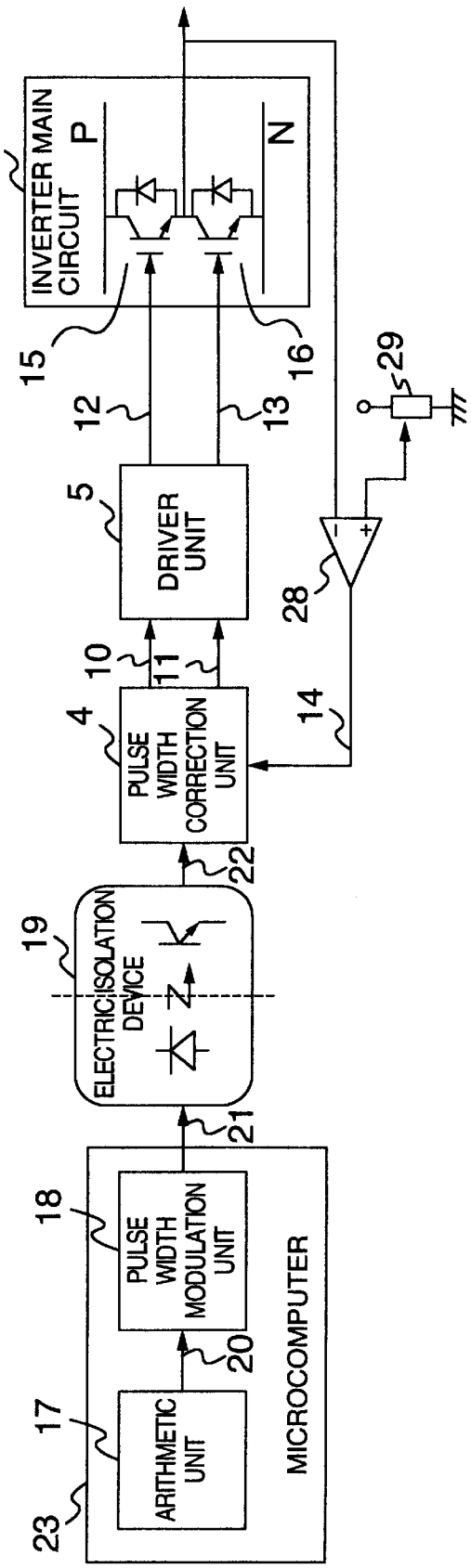
FIG. 8 is a block diagram showing an exemplary structure of the output voltage detection signal adjusting circuit shown in FIG. 7.

FIG. 8 shows an inverter apparatus according to another embodiment of the present invention. The adjusting unit 27 is comprised of a comparator 28 and a level adjusting variable resistor 29. When the output voltage of the inverter main circuit 6 exceeds the threshold voltage Vth set by the level adjusting variable resistor 29, the pulse signal outputted from the comparator 28 assumes high level, while when the output voltage of the inverter main circuit 6 becomes lower than the threshold voltage Vth set by the level adjusting variable resistor 29, the pulse signal outputted from the comparator 28 assumes low level.

With the arrangement of the adjusting unit described above, error contained in the output voltage of the inverter apparatus can be reduced or suppressed satisfactorily by taking into account various switching characteristics of the IGBTs. Of course, the present invention is never restricted to the structure of the adjusting circuit shown in FIG. 8. Other equivalent circuitries may be adopted substantially to the same effect.

As will now be appreciated from the foregoing description, according to the teachings of the present invention, the inverter output voltage detection signal can directly be compared with the PWM command pulse signal without intermediacy of the electric isolation device, whereby the error which would otherwise be brought about by the electric isolation device can be avoided. Besides, because the data outputted from the arithmetic unit is transmitted to the pulse width modulation unit by way of the parallel data bus for subsequent generation of the command pulse signal which is then transferred to the pulse width correction unit through the medium of the electric isolation device having a high-speed signal transfer capability, the controllable output frequency range of the inverter apparatus can be increased, to a great advantage.

In addition, by providing the adjusting unit in association with the inverter output voltage detection, error contained in the output voltage of the inverter can further be reduced, to another advantage.

Many modifications and variations of the present invention are possible in the light of the above techniques. It is therefore to be understood that within the scope of the appended claims, the invention may be practiced otherwise than as specifically described.

What is claimed is:

1. An inverter apparatus, comprising:
   arithmetic unit determining arithmetically pulse command numeric data;
   pulse width modulator receiving said pulse command numeric data for generating a PWM command pulse signal on the basis of said pulse command numeric data;
   pulse width correcting unit generating PWM pulse signals each added with a dead time on the basis of said PWM command pulse signal; and
   driver supplying said PWM pulse signals to switching elements of an inverter main circuit as driving signals, respectively,
   said inverter main circuit being so arranged as to convert a DC electric power to an AC electric power in response to said driving signals,
   wherein said pulse width correcting unit is so designed as to determine an output voltage error signal contained in the output power of said inverter main circuit on the basis of said PWM command pulse signal and an output voltage detection signal detected directly from an output voltage of said inverter main circuit, to thereby generate said PWM pulse signals so that said error signal can be suppressed, and wherein electrical isolator is disposed between said pulse width modulator and said pulse width correcting unit.

2. An inverter apparatus according to claim 1, wherein signal transmission between said pulse width modulator and said pulse width correcting unit is performed through a number of signal paths which corresponds to a number of phases of the output power of said inverter apparatus.

3. An inverter apparatus according to claim 1, wherein said electrical isolator is constituted by an isolating element whose performances are given at least by a minimum outer spatial distance of 4.9 mm, a minimum outer creeping distance of 4.8 mm, a minimum inner spatial distance of 0.08 mm, an input isolation power of 2500 V in rms for one minute, a maximum operative isolation voltage of 560 V in peak, a maximal allowable overvoltage of 4000 V in peak over ten seconds, and a maximum time duration of 100 ns allowable for a command pulse error ascribable to a difference between a pulse leading edge transfer delay time and a pulse trailing edge transfer delay time.

4. An inverter apparatus according to claim 1, further comprising:

adjusting unit adjusting a pulse detection level for said output voltage detection signal.

5. An inverter apparatus according to claim 4, wherein said adjusting unit includes a comparator and a variable resistor.

6. An inverter apparatus, comprising:

arithmetic unit determining arithmetically pulse command numeric data;

pulse width modulator receiving said pulse command numeric data for generating a PWM command pulse signal on the basis of said pulse command numeric data;

pulse width correcting unit generating PWM pulse signals each added with a dead time on the basis of said PWM command pulse signal;

driver supplying said PWM pulse signals to switching elements of an inverter main circuit as driving signals, respectively, an inverter main circuit for converting a DC power to voltage pulses by switching said DC power in response to said driving signals, detector detecting voltage pulses outputted from said inverter main circuit in a non-isolated manner to feed back to said pulse width correcting unit said detected pulses as an output voltage detection signal; and isolator capable of withstanding a high voltage disposed between said pulse width modulator and said pulse width correcting unit, said isolator realizing electrical isolation between said arithmetic unit and said pulse width modulator on one hand and said pulse width correcting unit on the other hand, wherein said pulse width correcting unit corrects said PWM pulse signal with said output voltage detection signal so that said output power of said inverter main circuit contains substantially no error components.

7. An inverter apparatus according to claim 6, wherein signal transmission between said pulse width modulator and said pulse width correcting unit is performed through a number of signal paths which corresponds to a number of phases of the output power of said inverter apparatus.

8. An inverter apparatus according to claim 6, wherein said electrical isolator is constituted by an isolating element whose performances are given at least by a minimum outer spatial distance of 4.9 mm, a minimum outer creeping distance of 4.8 mm, a minimum inner spatial distance of 0.08 mm, an input isolation power of 2500 V in rms for one minute, a maximum operative isolation voltage of 560 V in peak, a maximal allowable overvoltage of 4000 V in peak over ten seconds, and a maximum time duration of 100 ns allowable for a command pulse error ascribable to a difference between a pulse leading edge transfer delay time and a pulse trailing edge transfer delay time.

9. An inverter apparatus according to claim 6, further comprising:

adjusting unit adjusting a pulse detection level for said output voltage detection signal.

10. An inverter apparatus according to claim 9, wherein said adjusting unit includes a comparator and a variable resistor.

\* \* \* \* \*